United States Patent [19]
Boughner et al.

[11] Patent Number: 5,983,001
[45] Date of Patent: Nov. 9, 1999

[54] METHOD AND SYSTEM FOR FACILITATING THE AUTOMATIC CREATION OF TEST SCRIPTS

[75] Inventors: Van A. Boughner, San Jose; Douglas R. Stein, Santa Clara, both of Calif.

[73] Assignee: Sun Microsystems, Inc., Palo Alto, Calif.

[21] Appl. No.: 08/520,944

[22] Filed: Aug. 30, 1995

[51] Int. Cl.$^6$ .................................................. G06F 13/00
[52] U.S. Cl. .............................. 395/183.14; 395/183.22
[58] Field of Search ......................... 395/183.14, 183.22, 395/184.01

[56] References Cited

U.S. PATENT DOCUMENTS

| | | | |
|---|---|---|---|
| 4,696,003 | 9/1987 | Kerr et al. ................................ | 371/19 |
| 5,045,994 | 9/1991 | Belfer et al. ............................. | 364/200 |
| 5,153,886 | 10/1992 | Tuttle ..................................... | 371/67.1 |
| 5,303,146 | 4/1994 | Ammirato et al. ....................... | 364/401 |
| 5,335,342 | 8/1994 | Pope et al. ............................... | 395/575 |
| 5,475,843 | 12/1995 | Halviatti et al. ......................... | 395/700 |
| 5,499,180 | 3/1996 | Ammirato et al. ................... | 364/419.1 |
| 5,542,069 | 7/1996 | Meppelink et al. ..................... | 395/500 |
| 5,560,011 | 9/1996 | Uyama .................................... | 395/700 |
| 5,596,714 | 1/1997 | Connell ............................... | 395/183.14 |
| 5,600,789 | 2/1997 | Parker et al. ....................... | 395/183.14 |

OTHER PUBLICATIONS

Article entitled "Automated Software TEsting", by Tim Parker, Unix Review, Jan. 1995, pp. 49, 50, 52, 54 and 56.
Article entitled "Maintainable, portable GUI testing using widget–aware techniques", Mar.–Apr. 1995, pp. 32–36.

Primary Examiner—Robert W. Beausoliel, Jr.
Assistant Examiner—Norman M. Wright
Attorney, Agent, or Firm—Sun Microsystems, Inc.

[57] ABSTRACT

The present invention provides a method and system for creating a test script. The invention begins processing when a user requests the automatic creation of a test script. When the user next enters data on a graphical user interface, the data is sent to a display server which manages the input and output on the graphical user interface. The display server creates an event corresponding to the type of input entered on the graphical user interface.

In order to examine the context within which the event occurred, the present invention interposes a new version of a routine into the system so that the new routine is called when the GUI program attempts to retrieve the event from the display server buffer. Interposing ensures that the new version of the routine will be invoked before the original version of the routine. The interposed version of the routine examines the event, extracts relevant information regarding the event, and sends the information back to a module which automatically creates the test script from the information. Next, the interposed version of the routine examines and saves information regarding the context within which the event occurs (e.g., saving information regarding the widget within which the user action took place).

21 Claims, 6 Drawing Sheets

METHOD AND SYSTEM FOR FACILITATING THE AUTOMATIC CREATION OF TEST SCRIPTS

FIELD OF THE INVENTION

This invention relates generally to the field of software testing, and, more particularly, to the automated creation of test scripts.

BACKGROUND OF THE INVENTION

One aspect of the field of software testing focuses on creating test scripts which drive the testing of graphical user interface programs (GUI programs). A GUI program is a program that provides functionality which is not accessible from a command line but is accessible through the program's graphical user interface. A test script is a series of commands that instruct the GUI program to generate simulated events. The simulated events are then processed by the GUI program The result of the processing is used to test whether the GUI program is working as expected.

Before describing prior art methods for creating test scripts, it may be helpful to have a more detailed understanding of how test scripts drive the testing process. FIG. 1 illustrates a computer system 100 for testing a GUI program 101 using automated testing techniques found in the prior art. The computer system 100 includes a display device 103, a storage device 105, an input device 107, and a computer 109. The computer includes an interface 111, a processor 113, and a computer memory 115. The computer memory includes the GUI program 101, a display server 117, and a test script 119.

One prior art testing method simulates input events (such as mouse clicks) in order to test the same data processing paths that are invoked in response to actual user input. In particular, the prior art testing method invokes the test script 119 which contains commands that instruct the GUI program 101 to generate a simulated event. For example, a test script command may instruct the GUI program to create an event simulating a user's "double-lick" in a button on a graphical user interface ("GUI") 120. When the GUI program completes its processing of the simulated event, the method saves the current state of the GUI 120 (a.k.a., saving a "snapshot" of the GUI). The saved information is then used at a later point to test whether the GUI program is working properly.

One prior art method for automatically creating test scripts begins by having a user enter data through the GUI 120 using the input device 107. For example, the user may press a mouse button while a mouse cursor is over a "File Open" entry in a command menu. The user data is sent to an operating system 121. The operating system examines the data, determines that it was entered on the graphical user interface 120, and sends the data to the display server 117. The display server 117 manages input and output on the graphical user interface. The display server receives the user data and creates an appropriate event. An event is a data structure that stores information regarding user actions on the graphical user interface. Typical events are a "Button-Press" event and a "ButtonRelease" event. The event typically stores data indicating the absolute coordinates on the GUI 120 where the user action took place.

Once the event is created the display server 117 stores the event in a queue 123 where it can be retrieved and processed by the GUI program 101. At the same time the display server stores the event in the queue, the display server sends to a test script generator 125 information about the user action and about the absolute coordinates on the GUI 120 at which the user action took place. The test script generater takes the information, creates a corresponding command, and stores the command in a test script 119. The command instructs the GUI program 101 to perform the action at the absolute coordinates. In this way, the prior art automates test script generation.

The developers of the present invention recognized a problem with the prior art methods. In short, instructing the GUI program 101 to perform an action at specified coordinates on the GUI 120 is insufficient to ensure that the action will be successfully completed. If the method performs an action at the specified coordinates but the widget within which the action takes place is not currently displayed at those coordinates (e.g., it is not yet displayed at those coordinates or is currently displayed at other coordinates), then the action will fail. Assume that the method wants to perform a "Button Press" operation while a mouse cursor is over a "File Open" entry in a command menu. If the GUI program performs the "Button Press" operation at the appropriate coordinates but performs the operation when the command menu is not displayed at those coordinates, the Button Press operation will fail to open the file.

It would be beneficial to have a method and system that overcomes the limitations of the prior art

SUMMARY OF THE INVENTION

One embodiment of the present invention provides an improved method and system for creating a test script. The embodiment begins processing when a user requests the automatic creation of a test script. When the user next enters data on a graphical user interface, the data is sent to a display server which manages the input and output on the graphical user interface. The display server creates an event corresponding to the type of input entered on the graphical user interface. For example, if the user presses a mouse button while a mouse cursor is over a button on the graphical user interface then the display server creates a "Button Press" event.

In order to examine the context within which the event occurred, the present embodiment interposes a new version of a routine into the system so that the new version of the routine is called when the GUI program attempts to retrieve the event from the display server buffer. Interposing ensures that the new version of the routine will be invoked before the original version of the routine. The interposed version of the routine examines and saves information regarding the event. Next, the interposed routine examines and saves information regarding the context within which the event took place (e.g., by saving information regarding the widget on the GUI within which the user action occurred). Then the interposed routine sends the information back to a module which automatically creates the test script from the information. Finally, the interposed routine invokes the original routine so that the event can be retrieved from the display server buffer and processed normally.

By interposing a new version of the routine, the present embodiment examines and saves information regarding the context within which the event is created before that context changes due to event processing. This information is used to create test scripts which instruct the GUI program to perform actions within a given widget on the GUI, thus enabling the GUI program to wait until the appropriate widget is displayed before attempting to perform the user action.

NOTATIONS AND NOMENCLATURE

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

DETAILED DESCRIPTION

Overview Of The Preferred Method

One embodiment of the present invention provides an improved method and system for creating a test script. The embodiment begins processing when a user requests the automatic creation of a test script. When the user next enters data on a graphical user interface, the data is sent to a display server which manages the input and output on the graphical user interface. The display server creates an event corresponding to the type of input entered on the graphical user interface. For example, if the user presses a mouse button while a mouse cursor is over a button on the graphical user interface then the display server creates a "Button Press" event. In order to examine the context within which the event occurred, the present embodiment interposes a new version of a routine into the system so that the new routine is called when the GUI program attempts to retrieve the event from the display server buffer. Interposing ensures that the new version of the routine will be invoked before the original version of the routine.

The interposed version of the routine examines the event and extracts relevant information regarding the event. Next, the interposed version of the routine examines and saves information regarding the context within which the event occurs (e.g., by saving information regarding the widget on the GUI within which the user action took place). The interposed routine then sends the information back to a module which automatically creates the test script from the information. Finally, the interposed routine invokes the original routine so that the event can be processed normally.

By interposing a new version of the routine the present embodiment examines and saves information regarding the context within which the event is created before that context changes due to event processing. This information is used to create test scripts which instruct the GUI program to perform actions within a given widget on the GUI, thus enabling the GUI program to wait until the appropriate widget is displayed before attempting to perform the user action.

Overview Of The Preferred System

Figure 1:
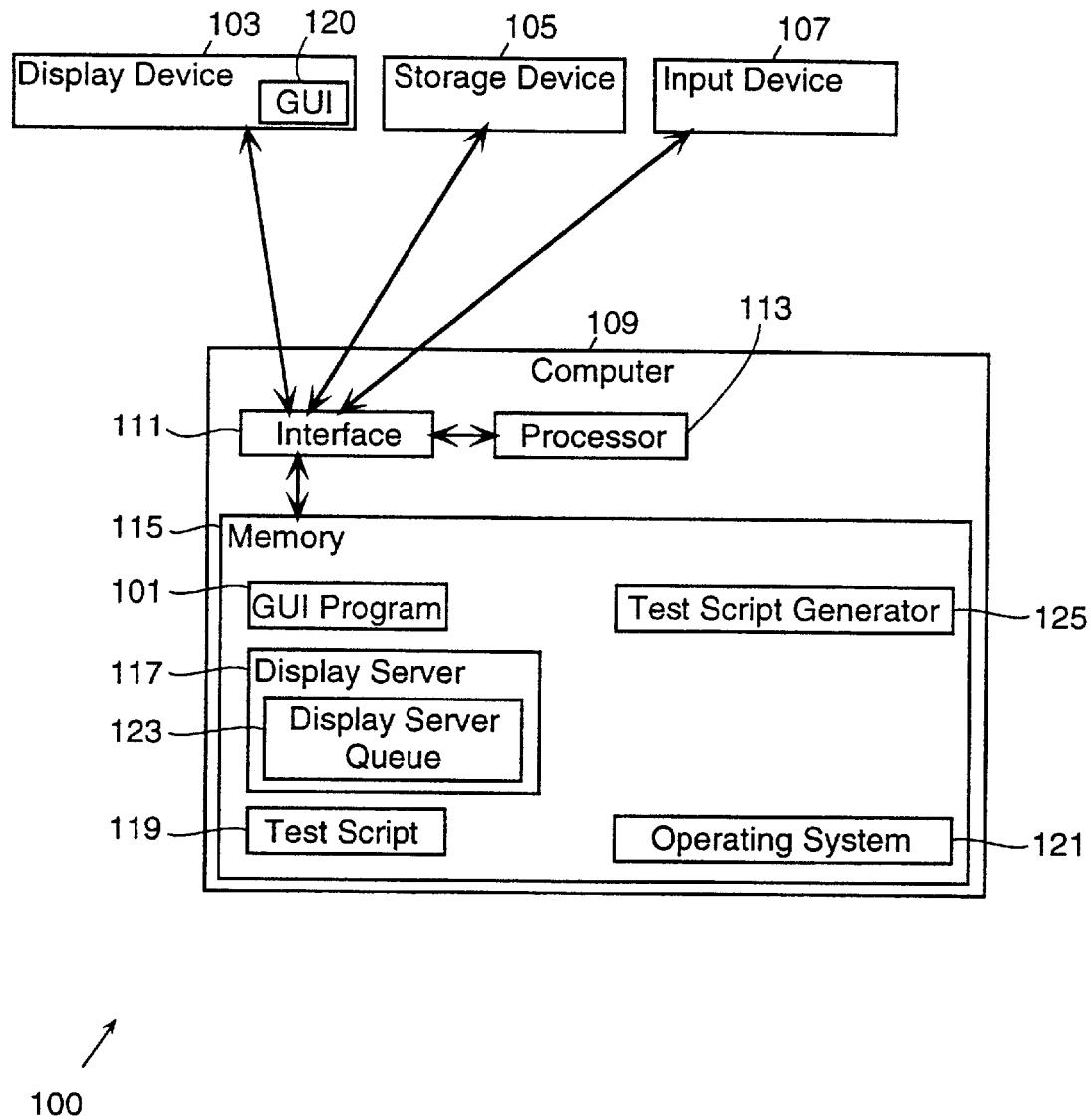
FIG. 1 illustrates a computer system for testing a GUI program using automated testing techniques found in the prior art.
Figure 2:
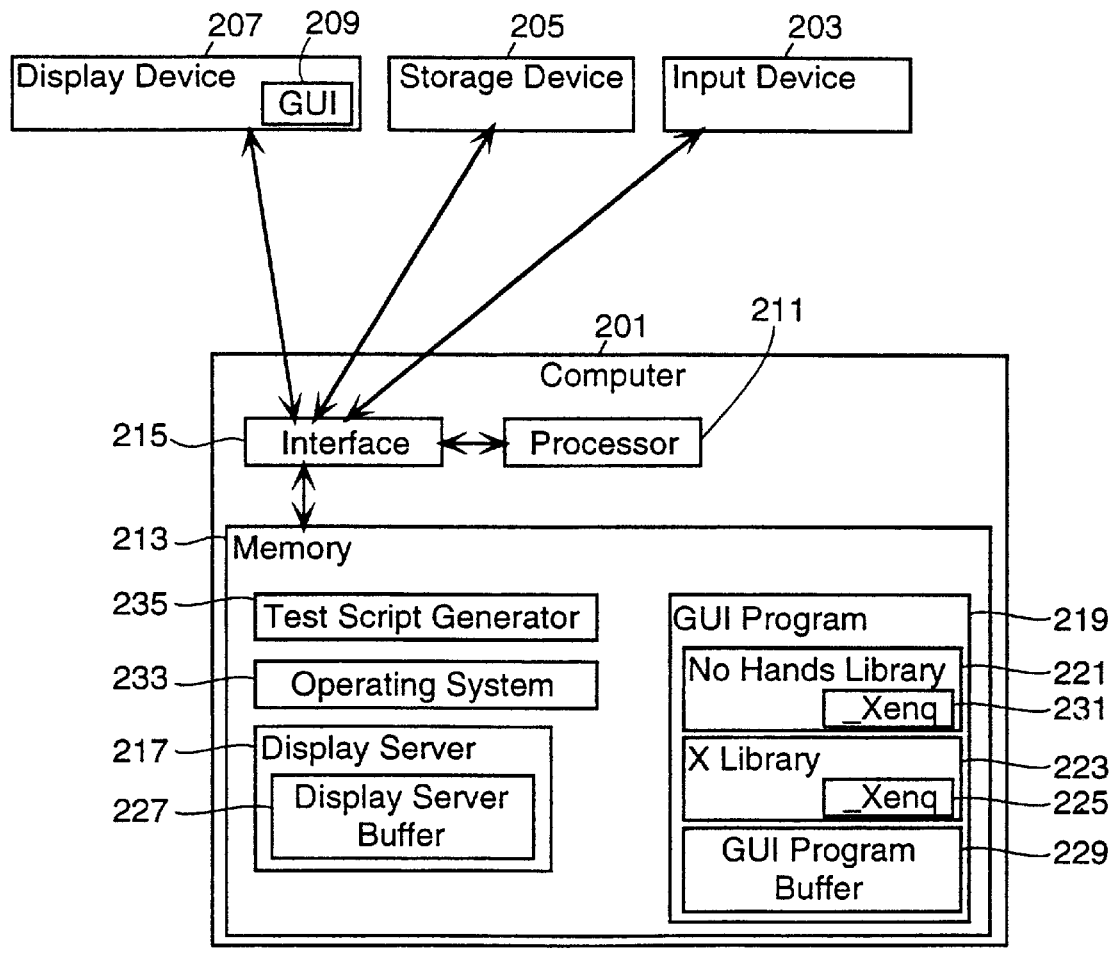
FIG. 2 is a block diagram of a computer system for practicing the preferred embodiment of the present invention.

FIG. 2 is a block diagram of a computer system 200 for practicing the preferred embodiment of the present invention. The computer system 200 includes a computer 201, an input device 203, a storage device 205, and a display device 207. The display device 207 displays a graphical user interface (GUI) 209. The GUI presents information through icons, and a user invokes commands by pointing to or manipulating the icons. The computer 201 includes a processor 211, a memory 213, and an interface 215 for enabling communication between the processor 211 and peripheral devices such as the input device 203 and the display device 207.

The computer memory contains a number of items including a display server 217 which manages input and output on the GUI 209. The memory 219 also includes a GUI program 219. It is the functionality embodied by the GUI program which is typically the subject of the testing process. The GUI program includes two linked libraries: a No Hands library 221 and an X library 223. The X library is preferably shipped with the GUI program 219. The X library contains routines for controlling a graphical user interface based on the X Window System™. Those of ordinary skill will understand that other window systems, and their corresponding libraries, could be used in place of the X Window System and its library. The No Hands library 221 is a library associated with the No Hands product from SunSoft, a division of Sun Microsystems, Inc.[1] Both the X library 223 and the No Hands library 221 contain versions of an __XEnq routine. The X library routine contains an original __XEnq routine 225. The original __XEnq routine retrieves events from a display server buffer 227 and stores the event in a GUI program buffer 229 so that the GUI program can process the event. The No Hands library 221 includes an __XEnq routine 231. The __XEnq routine 231 is an interposed version of the __XEnq routine 225. To interpose a library routine means to link the routine into a program so that it is called instead of another routine of the same name. For example, to interpose the __XEnq routine 231 means to link the __XEnq routine 231 into the GUI program 219 in a way that ensures that when the GUI program makes a call to __XEnq, that __XEnq routine 231 is invoked in place of the __XEnq routine 225. Using interposition ensures that pre-processing can take place in the system 200 before the original __XEnq routine 225 performs its processing steps. Interposition is preferably accomplished through use of a routine in an operating system 233. The preferred operating system is the Solaris[1] operating system from Sun Microsystems, Inc. In the Solaris operating system this interposition is performed using the LD_PRELOAD environment variable. The LD_PRELOAD environment variable contains a list of shared objects that are to be interpreted by the dynamic linker at run time. The specified shared objects are linked in after the program being executed (e.g., the GUI program 217) and before shared objects that the program references (e.g., the X library 223). Those of ordinary skill in the art will understand that mechanisms other than LD_PRELOAD will be used to interpose routines when using operating systems other than Solaris.

[1].Sun, SunSoft, and Sun Microsystems are trademarks or registered trademarks of Sun Microsystems, Inc., in the United States and in other countries.
[1].Solaris is a trademark or registered trademark of Sun Microsystems, Inc. in the United States or other countries.

Flow Diagrams

The preferred method for automatically creating a test script is perhaps best described by way of example. However, before the methods described below are invoked, certain preconditions should exist in the system. First, a user of the system has initiated a request to enter a "capture" mode that automatically creates a test script based on user inputs entered during capture mode. In response to the request to enter the capture mode, the GUI program 219 sets up a one-way connection (not shown) from the GUI program 219 to a test script generater 235. Any well known inter-process communication mechanism may be used to connect the GUI program with the test script generated. The preferred test script generator is the No Hands product from SunSoft. Once these preconditions are met the methods described below may be invoked.

Processing begins when a user takes an action on the GUI 209 using the input device 203. The operating system 233 captures this input, determines that it was initiated on the GUI 209, and sends the input to the display server 217 for processing. The display server 217 examines the input, determines what action was taken on the GUI 209, and creates a corresponding event. The display server 217 then stores the event in a display server buffer 227.

Figure 3:
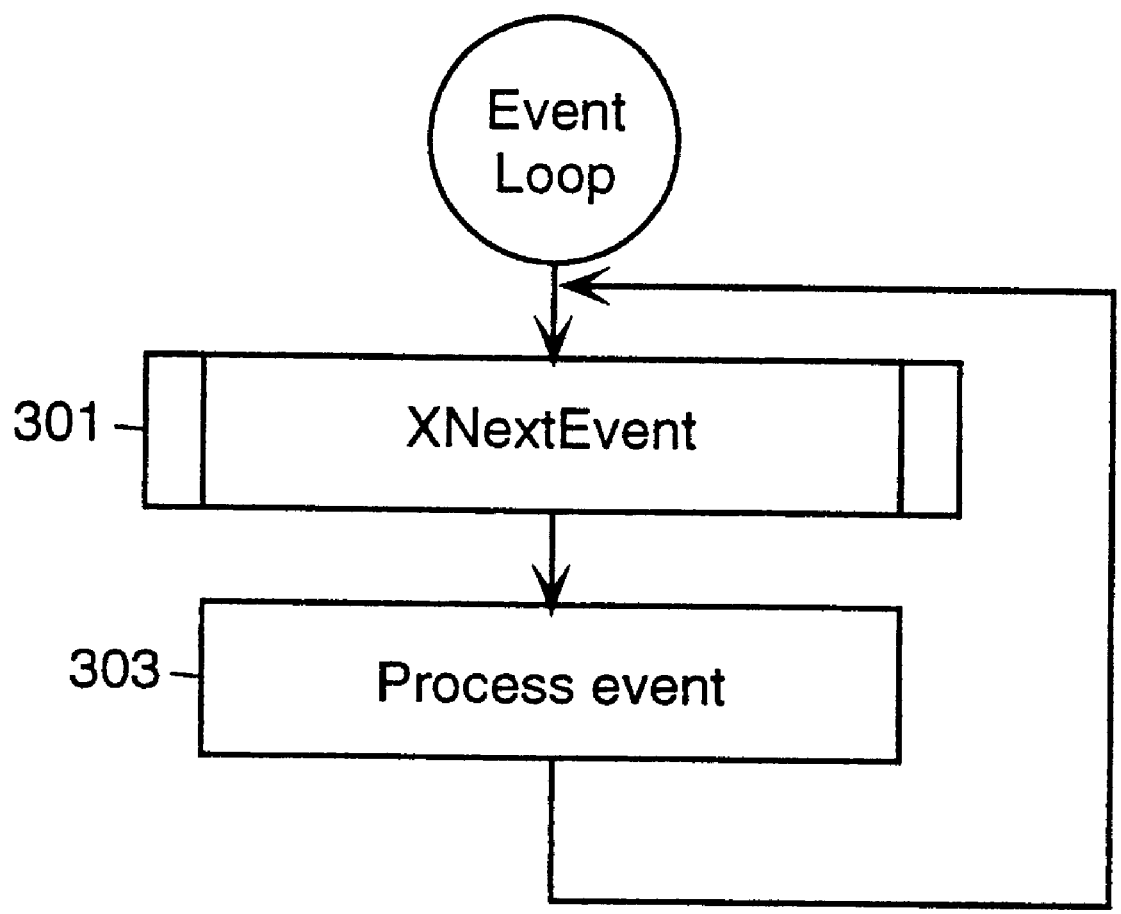
FIG. 3 is a flow diagram of a preferred event loop.

Periodically, the GUI program invokes an event loop to retrieve and process the event. FIG. 3 is a flow diagram of a preferred event loop. In step 301 the event loop invokes an interposed version of an XNextEvent routine which retrieves information from the event and sends the retrieved information to a test script generater where the information is used to generate a test script. The test script is preferably created in the Tcl language. The interposed version of XNextEvent then calls a standard XNextEvent routine that is part of the standard X Windows library. The standard X Windows routine retrieves the event from the display server buffer 217 and stores the event in the GUI program buffer 229. In step 303 the event loop processes the event. Upon return from step 303, the event loop continues with step 301. Those of ordinary skill will understand that commands other than XNextEvent would be used to accomplish the same functions if the system 200 was implemented using a windowing system other then the X Windows System.

Figure 4:
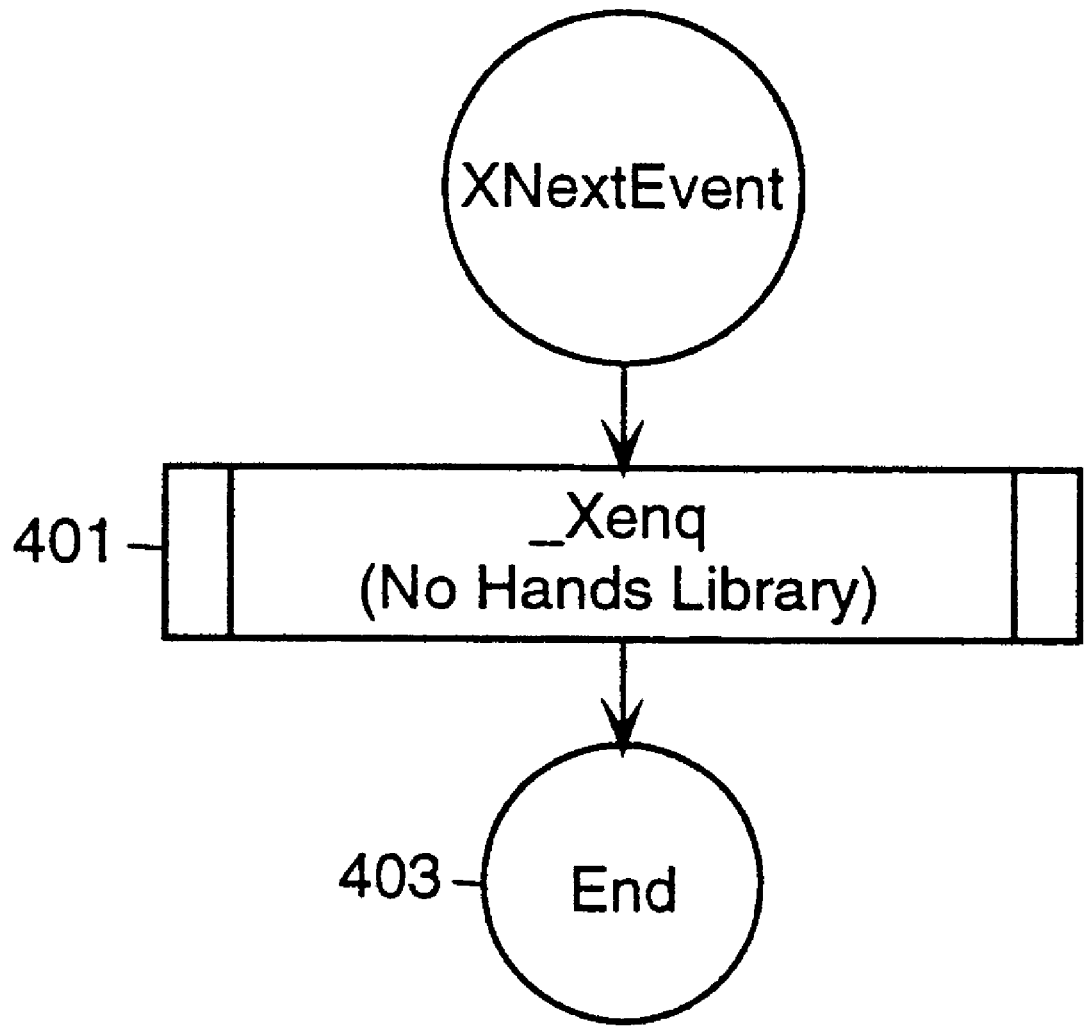
FIG. 4 is a flow diagram of an interposed XNextEvent routine.

FIG. 4 is a flow diagram of an interposed XNextEvent routine. In step 401 the routine calls the interposed _XEnq routine. The interposed _XEnq routine retrieves and stores information on the current state of the GUI 209, examines the event, retrieves all the information from the event that is needed to create or obtain an appropriate test script command, and sends the retrieved information back to the test script generater 235. The interposed _XEnq routine also retrieves the event and stores it in the GUI buffer 229 by calling the original _XEnq routine. In step 403 XNextEvent returns to the event loop where the event is processed.

Figure 5:
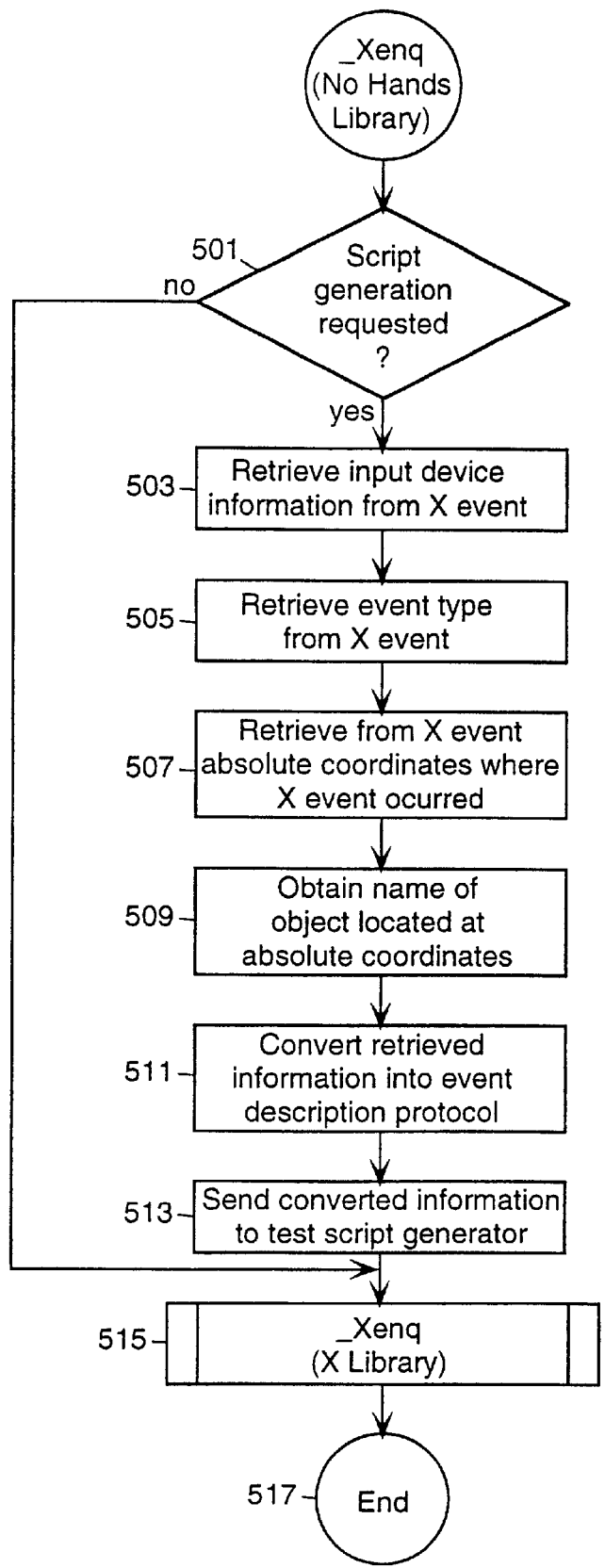
FIG. 5 is a flow diagram of an interposed __XEnq routine.

FIG. 5 is a flow diagram of the interposed version of an _XEnq routine. The interposed _XEnq routine retrieves and stores information on the current state of the GUI 209, examines the event, retrieves all the information from the event that is needed to create or obtain an appropriate test script command, and sends the retrieved information back to the test script generater 235. In addition, the interposed _XEnq routine retrieves the event and stores it in the GUI buffer 229 by calling the original _XEnq routine.

In step 501 the routine checks whether the user has requested that the system automatically generate a test script in response to user input. If the user has not requested automatic test script generation then the interposed _XEnq routine calls, in step 515, the original version of _XEnq, _XEnq 225, from the X library 223. The original _XEnq routine 225 retrieves the event and stores the event in the GUI buffer 229. The event is later processed by the event loop.

If the user has requested test script generation then in step 503 the routine examines the event stored in the display server buffer and retrieves information regarding the type of input device used to take the action on the GUI 209. For example, the action may have been initiated through use of a keyboard or pointing device. In step 505 the routine retrieves the event type from the event For example, the event type may have been the activation of a button on the GUI 209 or it may have been the movement of a mouse cursor without any corresponding mouse button activation. In step 507 the routine retrieves from the event the absolute coordinates where the action took place. Absolute coordinates are typically provided using x-y coordinates although an x-y-z coordinate system could also be used. In step 509 the routine sends the absolute coordinates off to a NhEncodeObject routine in the No Hands library 221 along with a request that the NhEncodeObject routine return a name of an object associated with the absolute coordinates. NhEncodeObject calls XQueryTree to find the window containing the absolute coordinates and then calls XtWindowToWidget to find the object given the window and the coordinates. Those of ordinary skill will understand that a routine other than NhEncodeObject or a different version of NhEncodeObject will be used when an embodiment uses a different GUI toolkit. In step 511, the routine converts the information it has gathered so far into a format that can be used by the test script generater 235. The preferred format is discussed below. In step 513 the interposed _XEnq routine sends the converted information back to the test script generater 235, where the information is used to create appropriate test script commands. In step 515 the interposed _XEnq routine calls the original version of _XEnq, _XEnq 225, from the X library 223. The original _XEnq routine 225 retrieves the event and stores the event in the GUI buffer 229. The event is later processed by the event loop.

Figure 6:
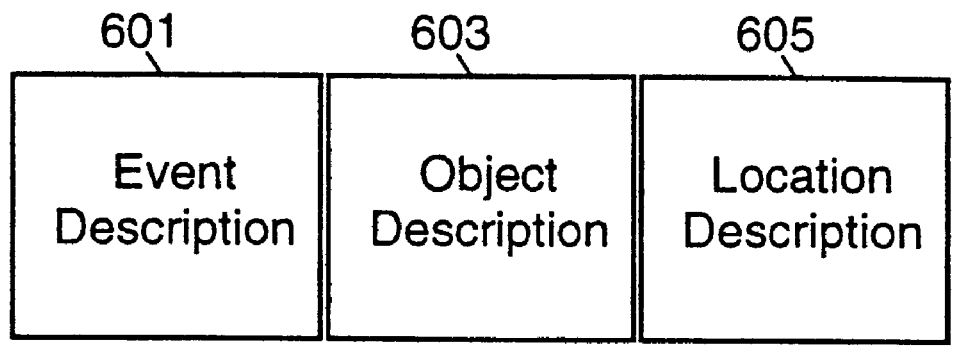
FIG. 6 is a block diagram of a preferred event description protocol. Appendix I is a No Hands manual.

FIG. 6 is a block diagram of a preferred event description protocol. Information retrieved from the event is converted to the event description protocol and sent to the test script generater where the information is used to create test script commands. The event description protocol includes an event description field 601, an object description field 603, and a location description field 605. The event description protocol preferably contains the following information:

event type (key, button, or motion);
    the key or mouse button involved;
    the action (press, release, or new coordinates);
    the object within which the action occurred (or nearest object to the action if it occurs outside the application window); and
    the coordinates relative to the object where action occurred.

The "I" character separates the main three components: Event, Object, and Location. The protocol does not require a field to specify which application the event comes from, because the test script generator makes this determination by observing which capture event line the description comes in over.

The Event Description Field

Subfields in the event description field are separated by spaces. The first word in the event description field specifies what kind of event it is. Different event types require different numbers and kinds of arguments, as described below:

button <which> <action> a mouse button event,

<which> is a number 1, 2, or 3, and

<action> is "press", "release", or "click"

char <which> <action> a keypress event using a printable character,

<which> is the character pressed (in numeric decimal form, e.g. 65),

<action> is "press", "release", or "click"

keysym <which> <action> a keypress event with an unprintable character or control key, the keysym given will either be in numeric form, or name form (if successfully looked up from keysymdef.h), <action> is "press", "release", or "click"

moveto a mouse movement without a corresponding button or key action at the end of it, there are no arguments (the destination is given in the Object and Location fields of the event description, as it is with other events above)

iconify/deiconify window manager action, no arguments (the Object field will describe which top level window is affected, and the Location field should be "na" for non-applicable)

raise/lower window manager action, no arguments, similar to iconify/deiconify above in all other respects move <x> <y> window manager action, the window is moved to a new location on the display, as given by the <x> and <y>arguments, and as with other window manager actions, the Object field specifies which top level window is affected, and the Location field is "na"

The Object Description Field

The format of the preferred object description field should be in accordance with formalized object naming standards. In the preferred embodiment, the object description field comprises a series of two subfields (with each pair of subfields being separated by a ":") : a class name, and an ordinal number. The ordinal number represents the order in which the object was created or rendered on the GUI. For example, if the object description field is describing the third "button" widget to be rendered on the GUI then the preferred subfield pair would use "button:3".

The Location Description Field

There are various locations within an object where events could occur, and some of these locations are very specialized to certain kinds of widgets. The subfields in the location description field are separated by spaces and some kinds of locations require additional arguments, as shown below:

center many objects, such as push buttons, have only one real place of interest within them, and that is the center (because pressing anywhere on the button will have the same affect, and so using the center is most esthetically pleasing)

xy <x> <y> some objects like drawing areas) have no subcomponents and therefore all actions within them will preferably be defined in coordinates relative to the upper-left hand corner, this kind of location definition also acts as a "catchall" in some situations nth <n> objects like scrolling lists have a definite concept of "nth" when it come to selecting things on display, and so this location device picks from the available items on display na when the location description field is not applicable (as it isn't in many window manager related actions) this location definition is used After the relevant information has been converted to the event description protocol, it is sent to the test script generator. The test script generator reads the information out of a buffer and preferably translates the information into a Tcl script. Currently, an instruction on a command line is used to write the Tcl script out to a file. Those of ordinary skill will understand that a GUI front end could instead be used to write the Tcl script out to the file. Using the techniques of the present invention, the automatic creation of test scripts is facilitated.

It will be appreciated that, although a preferred embodiment has been described herein for purposes of illustration, various modifications may be made without departing from the spirit and scope of the invention. For example, while the embodiment discussed above overloads the XNextevent routine from the X Window System, those of ordinary skill will understand that other routines within the X Windows system can also be overloaded to achieve the results of the present invention. For example, the following routines may instead be overloaded: QLength, XAllowEvents, XCheckIfEvent, XCheckMaskEvent, XCheckTyped-Event, XCheckTypedWindowEvent, XCheckWindowEvent, XEventsQueued, XGetInputFocus, XGetMotionEvents, XIfEvent, XMaskEvent, XPeekEvent, XPeekIfEvent, XPending, XPutBackEvent, XSelectInput, XSendEvent, XSetInputFocus, XSynchronize, XWindowEvent. Those of ordinary skill will also understand that routines in other window systems can also be overloaded using the teachings discussed above to accomplish the results of the present invention.

What is claimed is:

1. A computer controlled method for facilitating testing of a software component within a computer system, said method comprising steps of:

(a) receiving data entered into said computer system;

(b) retrieving context information within which said data was entered;

(c) invoking an interposed version of a first routine to examine said context information;

(d) invoking an original version of said first routine to process said data after step (c); and (e) initiating, responsive to step (c), creation of a test script.

2. The computer controlled method of claim 1 further comprising:

(f) converting said context information into an event description protocol; and (g) receiving said event description protocol by a test script generator.

3. The computer controlled method of claim 1 further comprising steps of:

(f) obtaining an event in response to step (a); and (g) retrieving, responsive to step (f), event information associated with said data.

4. The computer controlled method of claim 3 further comprising:

(h) processing said event.

5. The computer controlled method of claim 3 further comprising:

(h) converting said event information into an event description protocol; and (i) receiving said event description protocol by a test script generator.

6. The computer controlled method of claim 5 wherein said event description protocol includes an event description field, an object description field, and a location description field.

7. A computer controlled method for facilitating the testing of a software component within a computer system, said method comprising steps of:

(a) receiving data entered using a first widget presented by a user interface of said computer system, said first widget selected from one or more widgets presented by said user interface;

(b) retrieving attribute information regarding which of said one or more widgets presented by said user interface was used to enter said data; and (c) initiating creation of a test script responsive to step(b).

8. An apparatus having a central processing unit (CPU) and a memory coupled to said CPU for facilitating testing of a software component within a computer system, said apparatus comprises:

a data reception mechanism configured to receive data entered into said computer system;

a context retrieval mechanism configured to retrieve context information within which said data was entered through the data reception mechanism;

a first invocation mechanism configured to invoke an interposed version of a first routine to examine said context information;

a second invocation mechanism configured to invoke an original version of said first routine to process said data after operation of the first invocation mechanism; and an initiation mechanism configured to initiate, responsive to the first invocation mechanism, creation of a test script.

9. The apparatus of claim 8 further comprising:

a conversion mechanism configured to convert said context information into an event description protocol; and a test script generator configured to receive said event description protocol generated by the conversion mechanism.

10. The apparatus of claim 8 further comprising steps of:

an event acquisition mechanism configured to obtain an event responsive to the data reception mechanism; and an event information retrieval mechanism configured to retrieve, responsive to the event acquisition mechanism, event information associated with said data.

11. The apparatus of claim 10 further comprising:

an event processing mechanism configured to process said event.

12. The apparatus of claim 10 further comprising:

a formatting mechanism configured to convert said event information into an event description protocol; and a test script generator configured to receive said event description protocol.

13. The apparatus of claim 12 wherein said event description protocol includes an event description field, an object description field, and a location description field.

14. An apparatus having a central processing unit (CPU) and a memory coupled to said CPU for facilitating the testing of a software component within a computer system, said apparatus comprises:

a data receiver mechanism configured to receive data entered using a first widget presented by a user interface of said computer system, said first widget selected from one or more widgets presented by said user interface;

an attribute retrieval mechanism configured to retrieve attribute information regarding which of said one or more widgets presented by said user interface was used to enter said data; and an initiation mechanism configured to initiate creation of a test script responsive to the attribute retrieval mechanism.

15. A computer program product comprising a computer usable medium having computer readable code embodied therein for facilitating testing of a software component within a computer system, said computer readable code comprising:

computer readable program code configured to cause said computer to effect a data reception mechanism configured to receive data entered into said computer system;

computer readable program code configured to cause said computer to effect a context retrieval mechanism configured to retrieve context information within which said data was entered through the data reception mechanism;

computer readable program code configured to cause said computer to effect a first invocation mechanism configured to invoke an interposed version of a first routine to examine said context information;

computer readable program code configured to cause said computer to effect a second invocation mechanism configured to invoke an original version of said first routine to process said data after operation of the first invocation mechanism; and computer readable program code configured to cause said computer to effect an initiation mechanism configured to initiate, responsive to the first invocation mechanism, creation of a test script.

16. The computer program product of claim 15 further comprising:

computer readable program code configured to cause said computer to effect a conversion mechanism configured to convert said context information into an event description protocol; and computer readable program code configured to cause said computer to effect a test script generator configured to receive said event description protocol generated by the conversion mechanism.

17. The computer program product of claim 15 further comprising steps of:

computer readable program code configured to cause said computer to effect an event acquisition mechanism configured to obtain an event responsive to the data reception mechanism; and computer readable program code configured to cause said computer to effect an event information retrieval mechanism configured to retrieve, responsive to the event acquisition mechanism, event information associated with said data.

18. The computer program product of claim 17 further comprising:

computer readable program code configured to cause said computer to effect an event processing mechanism configured to process said event.

19. The computer program product of claim 17 further comprising:

computer readable program code configured to cause said computer to effect a formatting mechanism configured to convert said event information into an event description protocol; and computer readable program code configured to cause said computer to effect a test script generator configured to receive said event description protocol.

20. The computer program product of claim 19 wherein said event description protocol includes an event description field, an object description field, and a location description field.

21. A computer program product comprising:

a computer usable medium having computer readable code embodied therein for facilitating the testing of a software component within a computer system, said computer readable code comprising:

computer readable program code configured to cause said computer to effect a data receiver mechanism configured to receive data entered using a first widget presented by a user interface of said computer system, said first widget selected from one or more widgets presented by said user interface;

computer readable program code configured to cause said computer to effect an attribute retrieval mechanism configured to retrieve attribute information regarding which of said one or more widgets presented by said user interface was used to enter said data; and computer readable program code configured to cause said computer to effect an initiation mechanism configured to initiate creation of a test script responsive to the attribute retrieval mechanism.

\* \* \* \* \*